Aug. 7, 1928.
C. W. SHERMAN ET AL
1,679,921
SHOCK ABSORBER
Filed Feb. 24, 1927      2 Sheets-Sheet 1
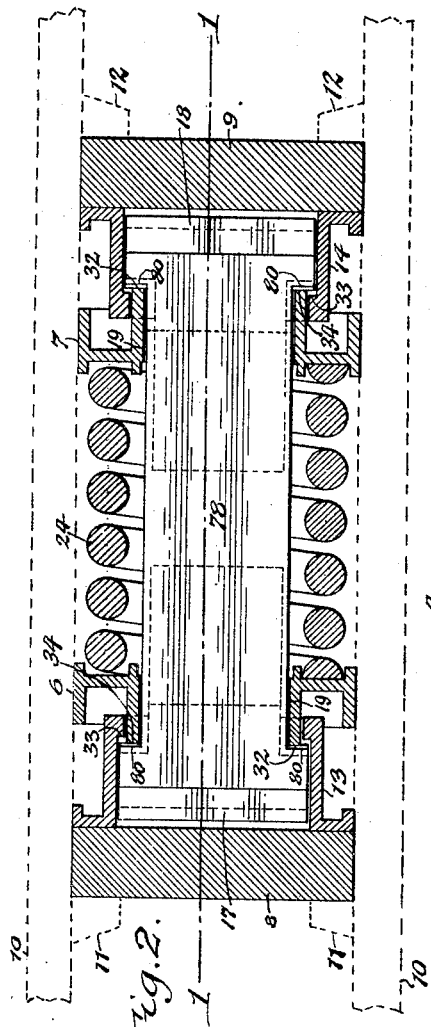
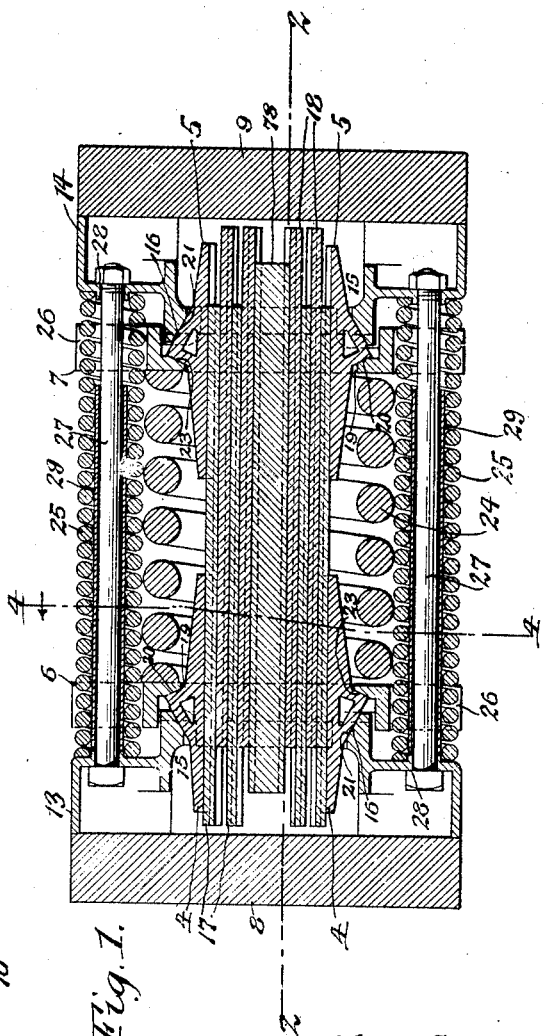

Aug. 7, 1928.
C. W. SHERMAN ET AL
1,679,921
SHOCK ABSORBER
Filed Feb. 24, 1927   2 Sheets-Sheet 2
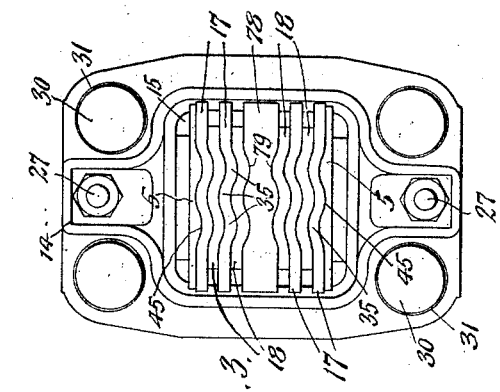
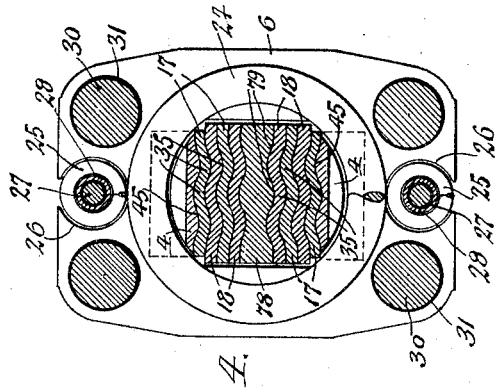
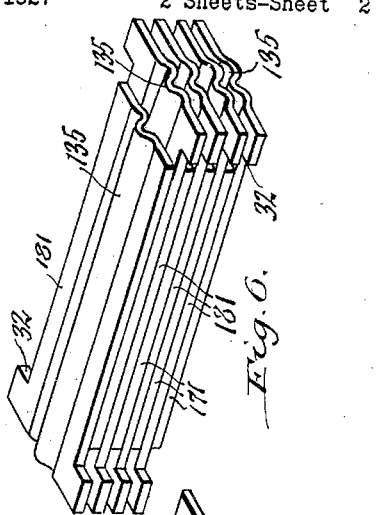
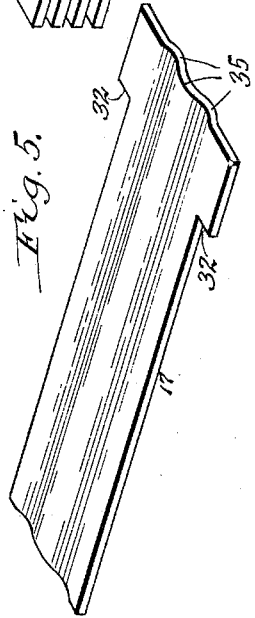

Patented Aug. 7, 1928.

1,679,921

UNITED STATES PATENT OFFICE.

CLIFTON W. SHERMAN AND JOSEPH M. HALL, OF HAMILTON, ONTARIO, CANADA, ASSIGNORS TO HALL DRAFT GEAR CORPORATION, OF BUFFALO, NEW YORK, A CORPORATION OF NEW YORK.

SHOCK ABSORBER.

Application filed February 24, 1927. Serial No. 170,611.

This invention relates more particularly to a shock absorber of the type containing a plurality of sets of intercalated friction plates, means for moving said sets of plates lengthwise relatively to each other, and mean for pressing said plates together transversely for increasing the friction contact between the same and the resistance effect while the sets of plates are moved longitudinally inward relatively to each other, this transverse pressure being relieved when the longitudinal inward pressure is relaxed, thus permitting of subsequently moving the sets of friction plates lengthwise outwardly relatively to each other with comparative freedom.

It has been found in practice that when the plates are made comparatively thin the same are liable to buckle slightly under very heavy endwise pressure.

The object of this invention is to avoid such buckling and to guide the plates lengthwise upon each other and this is accomplished by providing the plates with longitudinally extending corrugations which not only guide the plates and stiffen them and enable the same to withstand comparatively heavy endwise pressure but also increase the area or bearing surface of the plates for a given width and thus increase their frictional resistance and shock absorbing capacity.

In the accompanying drawings:

Figure 1 is a vertical section of a shock absorber embodying our improvements taken on line 1—1, Fig. 2.

Figure 2 is a horizontal longitudinal section of the same taken on line 2—2 Fig. 1.

Figure 3 is an end elevation of the shock absorber.

Figure 4 is a vertical transverse section of the same taken on line 4—4 Fig. 1.

Figure 5 is a perspective view of one of the friction plates.

Figure 6 is a perspective view of a group of intercalated plates embodying our invention in which no central over solid post is employed.

Similar characters of reference indicate like parts in the several figures of the drawings.

It is customary in shock absorbers of this type to mount the same lengthwise between two main or outer followers 8, 9, which are arranged transversely relatively to the line of pulling and pushing or buffing strains to which the car is subjected when coupling adjacent cars or when drawing a train of cars. For this purpose these main followers together with the shock absorber between them, are mounted between longitudinal sills 10, 10 of the car frame and the outer sides of the followers engage with transverse stops 11, 11, 12, 12, on these sills.

It will be assumed that the follower 8 is at the front and the follower 9 at the rear of the absorber when the same is installed so that during a buffing action on the shock absorber the front follower 8 will be moved inwardly away from its stops 11, 11 while the rear follower 9 will be held stationary, and during a pulling action on the shock absorber the front follower 8 will remain at rest while the rear follower 9 is moved inwardly by the load upon the same.

In its general organization the shock absorber which embodies my improvements is constructed as follows:

The numerals 13, 14 represent outer or main thrust heads which engage with their outer sides against the inner sides, respectively, of the front and rear followers and each of which is provided with a central opening 15 so that each of these heads has the form of a frame. On the opposite sides of the inner edge of the central opening of each outer thrust head the same has inclined faces 16, 16, which diverge inwardly, as shown in Fig. 1.

Between the sills is arranged a column of friction plates which includes two sets of intercalated friction plates 17, 18, which for convenience may be termed front and rear sets; the outer parts of the front set being arranged within the central opening of the front outer thrust head, and the rear parts of the friction plates being arranged within the central opening of the rear outer thrust head.

Adjacent to the inner sides of the outer thrust heads are two inner thrust heads or spring seats 6, 7 each of which has a central opening 19 receiving the adjacent parts of the friction plates, and provided on opposite sides of its central opening with inclined faces 20, which diverge outwardly and are preferably arranged opposite the inclined faces 16 of the outer thrust heads, as shown in Fig. 1.

It is desirable to employ the same number of plates in both sets and arrange the same symmetrically on opposite sides of the longitudinal center of the absorber. To permit of doing this a comparatively thick or heavy longitudinal core, post or friction plate 78 is arranged centrally between the two sets of side friction plates 17, 18, each set in this instance consisting of two side plates which are comparatively thin.

Arranged within the central openings of the thrust heads are friction wedge shoes 4 and 5 a pair of which engage their inner longitudinal sides with the transversely opposite outermost sides of the two side sets of friction plates adjacent to opposite ends thereof. On its outer longitudinal side each of the wedge shoes is provided with a transverse rib having an inclined outer face 21 engaging with the respective inclined face 16 of the adjacent outer thrust head and an inclined inner face 23 engaging with the respective inclined face 20 of the adjacent inner thrust head, so that the outer inclined faces of each pair of wedge shoes converge outwardly and the inner inclined faces of the same converge inwardly.

The numeral 24 represents a main thrust spring which is preferably comparatively heavy and of helical form and surrounds the central parts of the friction plates and the inner ends of the wedge shoes and bears at its opposite ends against the inner sides of the inner thrust heads. Adjacent to the outer diametrically opposite sides of the main thrust spring are two auxiliary release springs 25 which are of helical form and pass with their end portions through side openings 26 in the inner thrust head and bear at their opposite ends against the inner sides of the two outer thrust heads, as shown in Fig. 1.

Undue separation of the outer thrust heads is prevented, when the gear is removed from the car, by tie rods 27 extending through the release springs and inner and outer thrust heads, and provided with inwardly facing shoulders 28 bearing against the outer sides of the outer thrust heads. Upon these tie rods and within the release springs are arranged retaining sleeves 29 which latter float on these rods and prevent these springs from buckling but are sufficiently short so as not to interfere with the required movement of the main thrust heads toward and from each other.

The closing movement of the shock absorber is limited by longitudinal over solid or stop rods 30 mounted loosely in side openings 31 in inner thrust heads and each adapted to engage at its opposite ends with the inner sides of the outer thrust heads.

Each of the friction plates has its outer end made wider than the inner end thereof whereby inwardly facing shoulders 32 are formed on opposite edges of each of these plates which are adapted to be engaged by outwardly facing shoulders 33, 34, arranged respectively on the adjacent outer and inner thrust heads.

For the purpose of increasing the stiffness of the side friction plates 17, 18, each of these plates is provided with one or more longitudinal corrugations 35 for example, three of such corrugations, as shown in Figs. 1, 3, 4, and 5. In order to permit the central or core friction plate 78 to bear uniformly against the side friction plates on opposite sides thereof this central plate is provided on its opposite sides with longitudinal corrugations 79 which conform to those of the adjacent side plates 17, 18 and fit the same. For the same reason the inner or bearing sides of the wedge shoes 4, 5, are provided with longitudinal corrugations 45 which correspond in contour to the corrugations of the side friction plates and interengage therewith, as shown in Figs. 3 and 4.

The length of the side and central friction plates 17, 18 and 78 is slightly less than the space between the followers 8, 9 when the latter are in the fully closed position under the maximum pushing or pulling load to which the car may be subjected thereby preventing these plates from taking the oversolid load and causing the rods or bars 30 to be exclusively employed for this purpose.

When the shock absorber is in its fully expanded or released condition the front set of side friction plates 17 is pulled forwardly by engagement of the shoulders 32 on the plates with the shoulders 34 of the front spring seat 6 and the rear set of side plates 18 is pulled rearwardly by engagement of the shoulders 32 of these plates with the shoulders 34 of the rear spring seat 7, as shown in Fig. 2. The central or core friction plate 78 is shifted to a position midway between the followers upon releasing the shock absorber by engagement of the shoulders 34, 34 of the front and rear spring seats 6, 7 with the shoulders 80, 80 at the front and rear ends of the core plate, thereby ensuring an even support for the side friction plates throughout their length as the latter are pressed transversely inward by the wedge pressure means.

By thus corrugating the friction plates and shoes they are not only materially stiffened and present a greater surface for engagement with each other to increase the frictional resistance against longitudinal movement relatively to each other but these corrugations also serve to guide the plates and shoes upon each other and positively prevent lateral displacement so that a uniform operation of the gear is obtained.

The operation of the shock absorber is as follows:

Preparatory to placing the absorber in its operative position as part of the draft rigging between the front and rear stops of the car sills and connecting the same with the coupler yoke or similar actuating means, the springs of the absorber are put under an initial compression, as shown in Figs. 1 and 2, where the followers are represented in the maximum separated condition.

If a buffing or pulling force is applied to either of the followers, 8, 9, sufficient to overcome the initial resistance of the draft gear caused by the initial compression on the release springs 25 bearing direct on the thrust heads 13 and 14 and the frictional resistance set up by the action of the main thrust spring 24 acting inwardly on the wedge shoes 4 and 5, the latter are caused to slide on the outermost friction plates at both ends of the draft gear until the followers 8, 9, are brought into engagement with the ends of the side friction plates 17, 18.

The advance of the moving follower and moving outer thrust head, and the wedge action due to the engagement of the inclined faces of the thrust heads with the outer inclines on the companion wedge shoes causes the latter to be pressed transversely inwardly thereby increasing the frictional engagement of the several intercalated plates, and also increasing the frictional resisting capacity of these plates against moving one set of these plates inwardly relative to the other set. At the period of closing the draft gear the compression of the release springs 25 is increased as well as the compression of the main or thrust spring 24.

Immediately after the followers 8, 9, are forced into contact with the ends of the side friction plates 17, 18, the intercalated friction plates are forced to slide inwardly one set relatively to the other, the set at one end being held stationary while the set at the other end is forced toward the stationary set, at which time the resistance to the sliding of the friction plates upon each other absorbs the shock or blow with increasing capacity due to the increasing wedging action set up by compressing the main spring 24.

When the load on the shock absorber is relieved to such an extent so as to allow the release springs 25 to force the outer thrust heads 13, 14, apart the action is as follows:

First, the release springs 25 separate the outer or main thrust heads 13, 14, which tends to relieve the wedging action on the shoes 4, 5. The pressure of the main spring 24, which is under compression, forces the inner thrust heads or spring seats 6 and 7 against the shoes 4 and 5 tending to hold the latter in wedging engagement until the shoulders 34 are forced into contact with the shoulders 32 on the friction plates. The pressure of the main spring 24 is then divided between a wedging action on the wedge shoes and a retractive action on the friction plates, at which time the release springs 25 tend to force the outer or main thrust heads 13, 14 away from the wedging action of the friction or wedge shoes.

The shoulders 33 on the main thrust heads 13 and 14 engage the shoulders 32 of the friction plates and the shoulders 80 on the core plate to arrest farther outward movement of the main thrust heads after sufficient outward movement is gained to fully relieve the wedging action, any excess capacity in the release springs 25 being transferred to the friction plates so as to act upon them in the direction for assisting in retracting them to their outer position in which the gear is in release.

If desired, the central core plate and the friction plates may be made of the same length as the oversolid rods 30 so that the oversolid load is taken by the combined resistance of the friction plates, the central core and the oversolid rods. If the central core should be made slightly longer than the rods 30 and plates 17 and 18 then this core will take the oversolid load until its ends have been upset sufficiently by the battering of the followers to reduce the core in length to equal the oversolid rods after which the oversolid load will be divided between them.

A structure embodying our invention may also be organized without employing a central core, as shown in Fig. 6, in which the two sets of friction plates 171, 181 are intercalated and adapted to slide lengthwise relatively to one another and each of the plates is provided with longitudinal corrugations 135 which correspond and fit into the like corrugations of adjacent plates.

We claim as our invention:

1. A shock absorber comprising a plurality of sets of intercalated friction plates which are corrugated lengthwise and have their corrugations fitting into one another, means for moving said plates lengthwise relative to each other, and means for producing a lateral pressure of said plates against each other, including shoes provided on their inner sides with longitudinal corrugations engaging with the corrugations on the exterior of the outermost friction plates.

2. A shock absorber comprising a plurality of sets of intercalated friction plates which are corrugated lengthwise and have their corrugations fitting into one another, means for moving said plates lengthwise relative to each other, and means for producing a lateral pressure of said plates against each other, including shoes provided on their inner sides with longitudinal corrugations engaging with the corrugations on the exterior of the outermost friction plates, and wedge means acting on said shoes.

3. A shock absorber comprising followers movable toward and from one another, a plurality of intercalated friction plates arranged in a column between said followers and including a central core plate and two sets of side plates or symmetrical members arranged on opposite sides of the central plate, said central and side plates being provided with corresponding longitudinal corrugations which engage with each other, and means for producing lateral pressure on said plates.

4. A shock absorber comprising followers movable toward and from one another, a plurality of intercalated friction plates arranged in a column between said followers and including a central core plate and two sets of side plates or symmetrical members arranged on opposite sides of the central plate, said central plate being provided at its opposite ends with inwardly facing shoulders, said side plates being provided at their outer ends with inwardly facing shoulders, and thrust heads provided with outwardly facing shoulders adapted to engage the inwardly facing shoulders of said plates, and means for producing lateral pressure against said plates.

5. A shock absorber comprising followers movable toward and from one another, a plurality of intercalated friction plates arranged in a column between said followers and including a central core plate and two sets of side plates or symmetrical members arranged on opposite sides of the central plate, said central plate being provided at its opposite ends with inwardly facing shoulders, said side plates being provided at their outer ends with inwardly facing shoulders, thrust heads provided with outwardly facing shoulders adapted to engage the inwardly facing shoulders of said plates, and means for producing lateral pressure against said plates, including a spring resistance.

6. A shock absorber comprising followers movable toward and from one another, a plurality of intercalated friction plates arranged in a column between said followers and including a central core plate and two sets of side plates or symmetrical members arranged on opposite sides of the central plate, said central plate being provided at its opposite ends with inwardly facing shoulders, said side plates being provided at their outer ends with inwardly facing shoulders, thrust heads provided with outwardly facing shoulders adapted to engage the inwardly facing shoulders of said plates, outer thrust heads engaging with said followers and having outwardly facing shoulders engaging with the inwardly facing shoulders of said plates, inner thrust heads having outwardly facing shoulders engaging the inwardly facing shoulders of said plates, releasing springs engaging the outer thrust heads, a main spring resistance engaging the inner thrust heads, and means for producing lateral pressure against said plates including said main spring resistance.

7. A shock absorber comprising followers movable toward and from one another, a plurality of intercalated friction plates arranged in a column between said followers and including a central core plate and two sets of side plates or symmetrical members arranged on opposite sides of the central plate, said central plate being provided at its opposite ends with inwardly facing shoulders, said side plates being provided at their outer ends with inwardly facing shoulders, thrust heads provided with outwardly facing shoulders adapted to engage the inwardly facing shoulders of said plates, outer thrust heads engaging with said followers and having outwardly facing shoulders engaging with the inwardly facing shoulders of said plates, inner thrust heads having outwardly facing shoulders engaging the inwardly facing shoulders of said plates, releasing springs engaging the outer thrust heads, a main spring resistance engaging the inner thrust heads, and means for producing lateral pressure against said plates, including shoes bearing against the outermost plates and co-operating with said thrust heads and also including said main spring resistance.

8. A shock absorber comprising followers movable toward and from one another, a plurality of intercalated friction plates arranged in a column between said followers and including a central core plate and two sets of side plates or symmetrical members arranged on opposite sides of the central plate, said central plate being provided at its opposite ends with inwardly facing shoulders, said side plates being provided at their outer ends with inwardly facing shoulders, thrust heads provided with outwardly facing shoulders adapted to engage the inwardly facing shoulders of said plates, outer thrust heads engaging with said followers and having outwardly facing shoulders engaging with the inwardly facing shoulders of said plates, inner thrust heads having outwardly facing shoulders engaging the inwardly facing shoulders of said plates, releasing springs engaging the outer thrust heads, a main spring resistance engaging the inner thrust heads, and means for producing lateral pressure against said plates, including shoes bearing against the outermost plates and co-operating with said inner thrust heads and having wedging engagement with said outer thrust heads and also including said main spring resistance.

9. A shock absorber comprising followers movable toward and from one another, a plurality of intercalated friction plates arranged in a column between said followers and including a central core plate and two sets of side plates or symmetrical members arranged on opposite sides of the central plate, said central plate being provided at its opposite ends with inwardly facing shoulders, said side plates being provided at their outer ends with inwardly facing shoulders, thrust heads provided with outwardly facing shoulders adapted to engage the inwardly facing shoulders of said plates, outer thrust heads engaging with said followers and having outwardly facing shoulders engaging with the inwardly facing shoulders of said plates, inner thrust heads having outwardly facing shoulders engaging the inwardly facing shoulders of said plates, releasing springs engaging the outer thrust heads, a main spring resistance engaging the inner thrust heads, and means for producing lateral pressure against said plates, including shoes bearing against the outermost plates and having wedging engagement with said inner and outer thrust heads and also including said main spring resistance.

In testimony whereof we hereby affix our signatures.

CLIFTON W. SHERMAN.
JOSEPH M. HALL.